(12) United States Patent
Taylor

(10) Patent No.: US 6,896,316 B1
(45) Date of Patent: May 24, 2005

(54) SEMI-TRAILER FOR TRANSPORT OF RECYCLABLE MATERIALS

(76) Inventor: William S. Taylor, P.O. Box 148, Baxter, KY (US) 40806

( * ) Notice: Subject to any disclaimer, the term of this patent is extended or adjusted under 35 U.S.C. 154(b) by 3 days.

(21) Appl. No.: 10/737,564

(22) Filed: Dec. 16, 2003

(51) Int. Cl.⁷ .............................................. B62D 33/04
(52) U.S. Cl. ................................ 296/182.1; 296/183.1; 296/186.4
(58) Field of Search .................. 296/182.1, 183.1, 296/186.1, 186.4; 414/373; 105/239, 240, 105/276, 279, 286, 311, 258, 377.1, 235

(56) References Cited

U.S. PATENT DOCUMENTS

| | | | | |
|---|---|---|---|---|
| 2,711,343 A | * | 6/1955 | Falk et al. | 296/186.4 |
| 4,140,339 A | * | 2/1979 | Fredin | 296/100.17 |
| 4,268,084 A | * | 5/1981 | Peters | 296/148 |
| 4,489,975 A | * | 12/1984 | Fredin | 296/186.4 |
| 4,690,609 A | * | 9/1987 | Brown | 296/186.4 |
| 5,488,911 A | | 2/1996 | Riggin | |
| 5,667,268 A | | 9/1997 | Bump | |
| 6,079,762 A | * | 6/2000 | Strasser | 296/36 |
| 6,309,164 B1 | | 10/2001 | Holder et al. | |
| 6,695,390 B2 | * | 2/2004 | Bucco Morello | 296/36 |
| 2002/0158488 A1 | * | 10/2002 | Sugimoto | 296/147 |

* cited by examiner

Primary Examiner—Lori L. Coletta
(74) Attorney, Agent, or Firm—Pitts & Brittian, P.C.

(57) ABSTRACT

A semi-trailer for transport of recyclable materials including a wheeled undercarriage having a platform mounted thereon with dimensions sufficient for stacking a plurality of crushed vehicles thereon. A contained area having an open top is bounded by a fixed sidewall having front and rear end walls attached perpendicular thereto, and a second sidewall pivotably mounted for movement between a closed position parallel to the fixed sidewall and a raised position above the platform. The second sidewall is supported by front and rear upper segments extending adjacently above and pivotably connected to respective front and rear end walls, for clamshell movement relative to the platform. Hydraulic members extend from mid-portions of front and rear end walls and connect to front and rear upper segments for raising the second sidewall to provide unhindered side access. The second sidewall is moved to the closed position for contained transport of recyclable materials over public roads.

17 Claims, 5 Drawing Sheets

SEMI-TRAILER FOR TRANSPORT OF RECYCLABLE MATERIALS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to transport vehicles for moving recyclable materials long distances. More particularly, this invention pertains to a semi-trailer for contained transport of crushed vehicles and other bulky recyclable materials on public roads.

2. Description of the Related Art

As prices for recyclable salvage materials escalate, the materials are being transported over significantly greater distances on public roads. Prior transport vehicles include flat-bed trucks and semi-trailers lacking walls on which crushed vehicle bodies and other bulky recyclable materials are stacked and secured by securing devices such as chains and cables. Due to increasing frequency of mishaps involving damage to public vehicles by ejection of debris from flat-bed trucks and semi-trailers lacking side walls, the U.S. Department of Transportation has developed regulations requiring transport of crushed vehicles contained by a transport vehicle having side walls when moved on public roads.

Prior methods of transport of refuse and recyclable materials over short distances in local communities include trucks having individual hoppers accessible from a perimeter of the vehicle, or dump trucks having an open bay in which materials were placed. For long distance transport of refuse and recyclable materials, dump trucks have typically been utilized with no covering over the materials. The above described vehicles are typically not sized to accept crushed vehicles or other bulky recyclable materials that are preferably loaded and unloaded utilizing a forklift system and/or an overhead crane system. Flat-bed rail cars have been utilized for transport of refuse and recyclable materials contained in boxes mounted on the flat-bed rail cars, or flat-bed rail cars have been utilized to transport crushed vehicles stacked and chained thereon. Typical rail cars utilized for hauling refuse have included cars having four side walls and an enclosing top wall, with side doors that slide sideways to provide one side opening for loading and unloading refuse. If a rail car utilizes a side door that opens upwards, the enclosing top wall must be pivoted and generally obstructs the range of opening of the side door. Further, the enclosing top wall for a rail car does not allow loading and unloading access from overhead by cranes or forklifts.

An improved transport vehicle is needed to meet federal regulations for contained transport of crushed vehicles and other bulky recyclable materials on public roads. Further, an improved semi-trailer transport vehicle is needed to provide containment of crushed vehicles and other recyclable materials when the semi-trailer travels on public roads while offering efficient loading and unloading of crushed vehicles and other materials due to unobstructed side access or unobstructed overhead access with a minimum of movement of sidewalls.

BRIEF SUMMARY OF THE INVENTION

According to one embodiment of the present invention, a semi-trailer is provided for transport over public roads of crushed vehicles and other bulky recyclable materials to recycling facilities. The semi-trailer includes a platform supported by a wheeled undercarriage, the platform having an adequate width between first and second sides to receive a plurality of crushed vehicles thereon. The platform includes a fixed sidewall disposed to extend vertically along the length of the platform first side, and front and rear end walls extended vertically from the platform and attached at respective front and rear corner junctions with the fixed sidewall. A fourth vertical wall is provided by a pivotable second sidewall.

The second sidewall is positioned to extend vertically along a length of a second side of the platform. The second sidewall is pivotably mounted for clamshell movement between a closed position parallel with the fixed sidewall to a raised position disposed above the platform. The sidewalls and end walls extend to form an open top of sufficient width and length to receive crushed vehicles therein. The second sidewall includes front and rear upper support segments extended to traverse the width of the platform above respective front and rear end walls. Each upper support segment is pivotably mounted to pivot upwards relative to the fixed sidewall and the front and rear end walls. The fixed sidewall, the front and rear upper support segments and the second sidewall, when in the closed position, provide an upper boundary for the open top of the semi-trailer, thereby allowing for loading and unloading of crushed vehicles when the second sidewall is in the closed position. When positioned in the raised position, the elevated second sidewall provides an unimpeded second side length for rapid loading and unloading of the crushed vehicles and other bulky recyclable materials.

A hydraulic mechanism is provided for raising and lowering the second sidewall, including front and rear hydraulic cylinders and pistons for moving the second sidewall from the closed position to the raised position above the platform. In the raised position, a plurality of crushed vehicles and other recyclable materials are readily stacked on the platform. In the closed position, additional crushed vehicles and other recyclable materials can be loaded through the open top, with the front and rear end walls, fixed sidewall and second sidewall containing the stacked crushed vehicles and other recyclable materials without restraining chains during transport by the semi-trailer towed over public roads.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
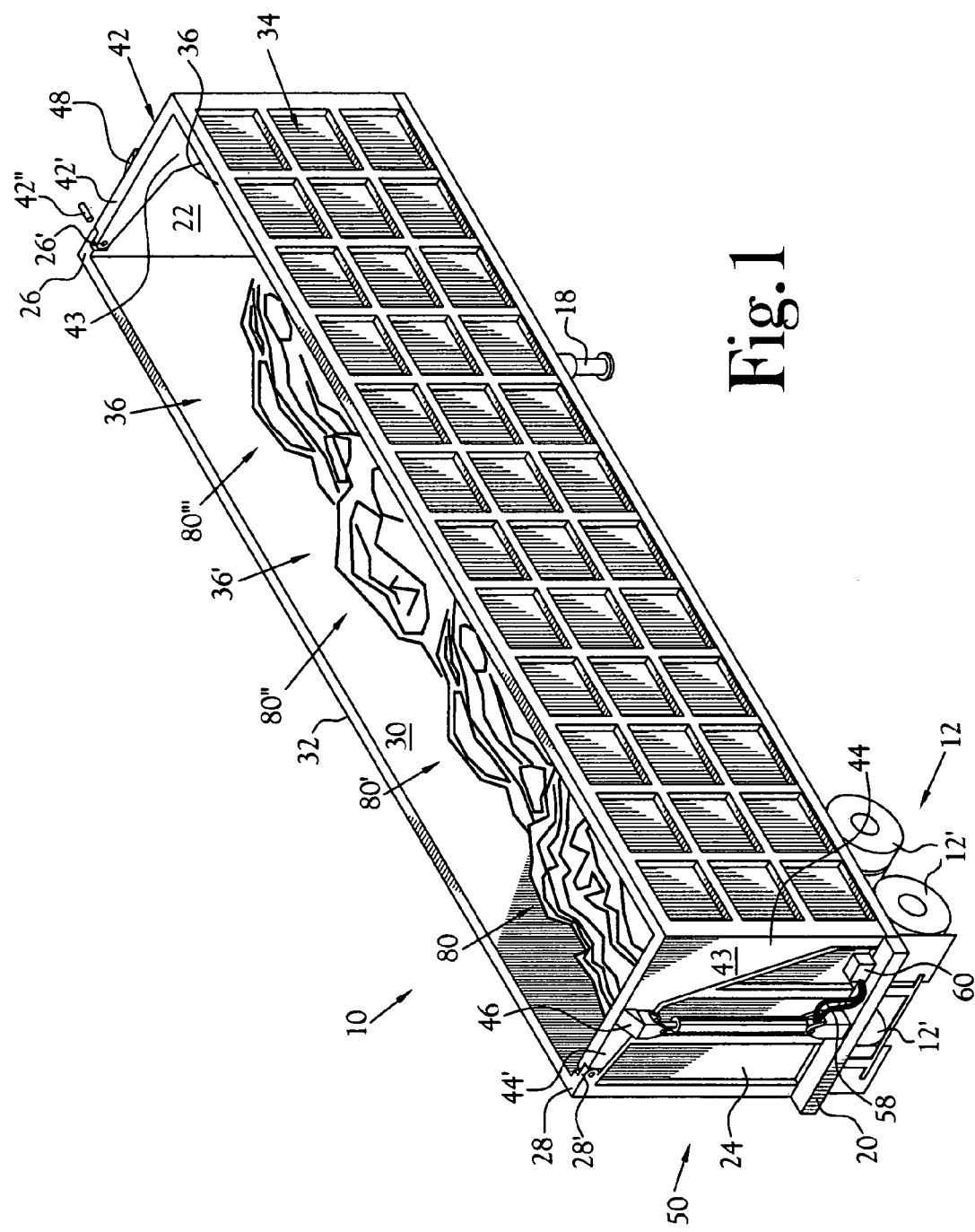
FIG. 1 is a perspective view of a semi-trailer of the present invention providing top loading therein of crushed vehicles and other recyclable materials.
Figure 2:
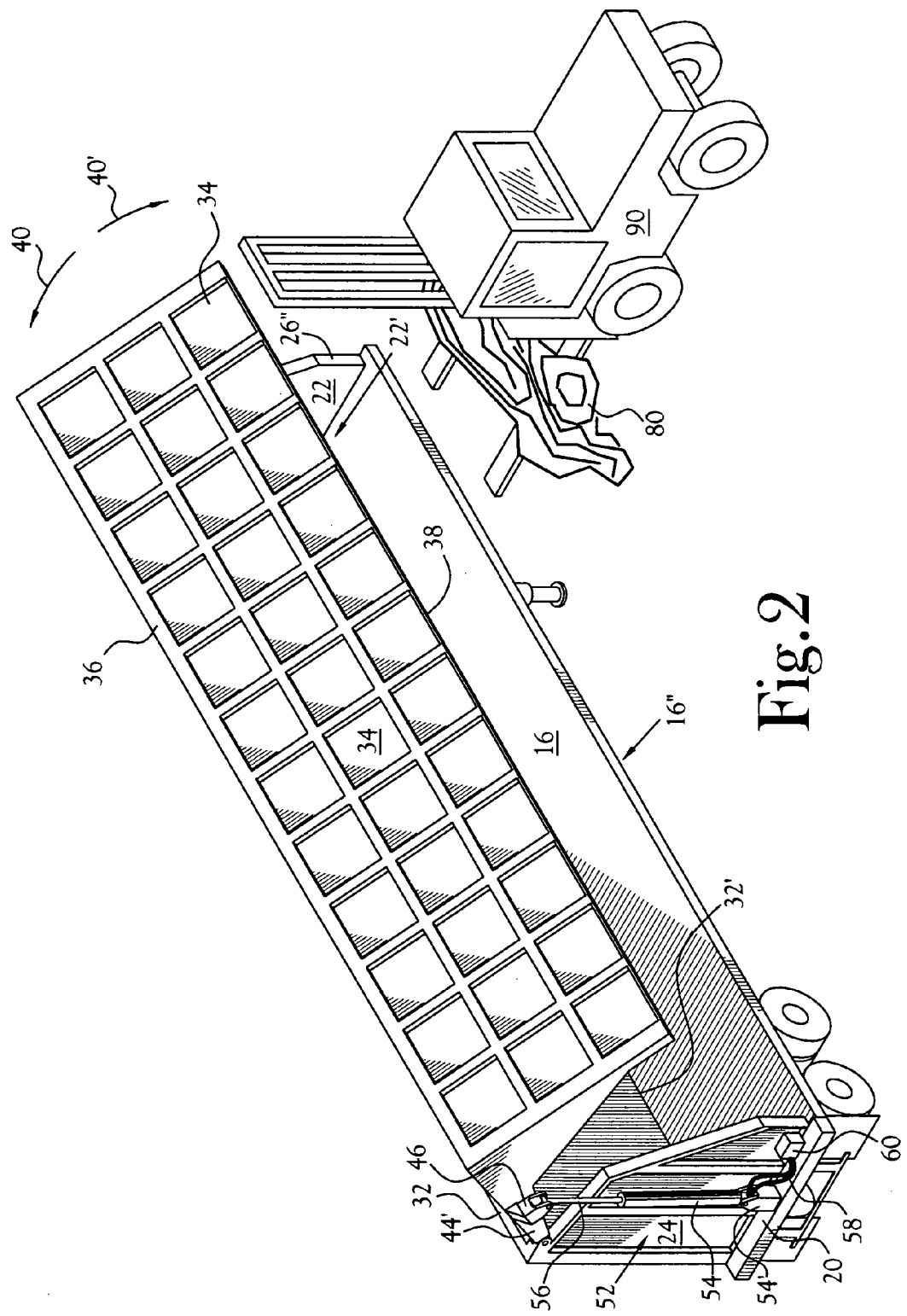
FIG. 2 is a perspective view of FIG. 1, illustrating the movable sidewall in a raised position for side loading onto the platform of the semi-trailer.
Figure 6:
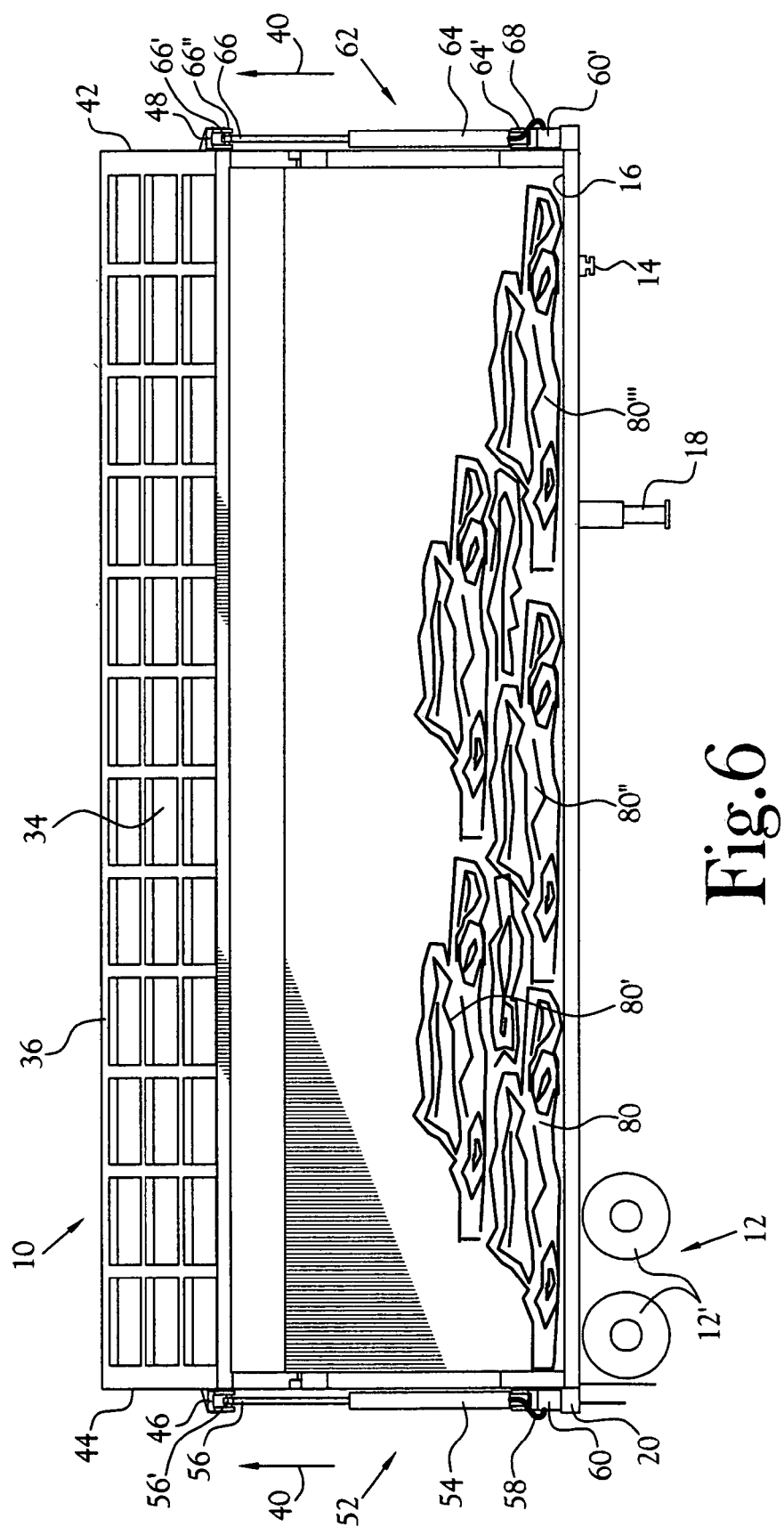
FIG. 6 is a side view of FIG. 2, illustrating the movable sidewall in a raised position with a plurality of crushed vehicles stacked in the semi-trailer.

In accordance with the present invention, a semi-trailer 10 is provided for contained transport of crushed vehicles 80 and other bulky salvageable materials to recycling facilities. The semi-trailer 10 includes a multi-wheeled undercarriage 12 having a plurality of wheels 12' sized to provide adequate load-carrying capacity of up to about a twenty ton load capacity in the preferred embodiment for a flatbed platform 16 mounted above the multi-wheeled undercarriage 12 (see FIGS. 1 and 2). The platform includes an adequate width separating a first side 16' from a second side 16" to allow for receipt thereon of a plurality of crushed vehicles 80, 80', 80", 80'" either through an open top 36' or through a side access along the second side 16" (see FIGS. 1 and 2). The platform 16 and multi-wheeled undercarriage 12 includes a front support 18 that is extended during stationary loading and unloading of the platform 16 in order to maintain a level platform. The front support 18 is retractable under the first side 16' of the platform 16 during towed transport of the wheeled undercarriage 12 in a conventional manner. A trailer hitch 14 is disposed under the platform fixed front end wall 22 (see FIG. 6), or a similar coupling device is utilized as known to those skilled in the art of semi-trailer coupling. The trailer hitch 14 is releasably connectable to a docking unit on a tractor-truck vehicle for towing the semi-trailer 10 over public roads.

Figure 3A:
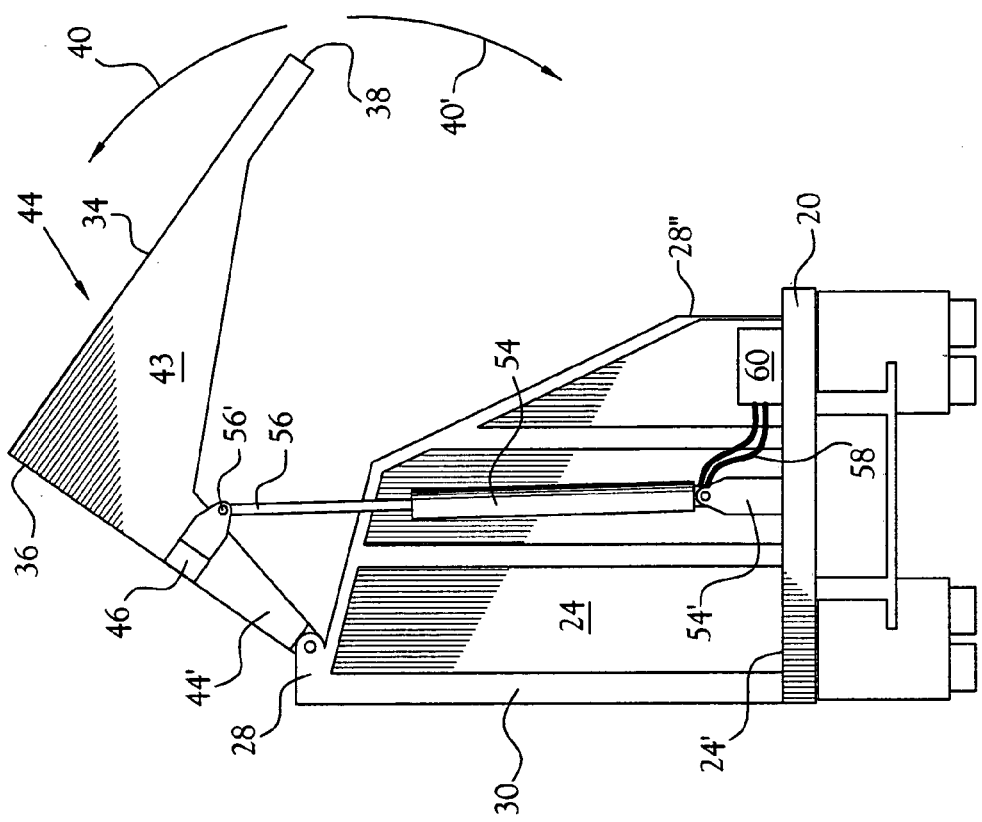
FIG. 3A is a rear view of FIG. 1, illustrating the closed position of the movable second sidewall having a hydraulic lift mechanism for lifting the movable second sidewall above the semi-trailer platform.

The platform 16 includes a fixed sidewall 30 forming a first containing wall extending vertically along the length of the platform first side 16' (see FIG. 3A). The fixed sidewall 30 is extended for a height above the platform 16 of between about 8 feet 6 inches, for a total height above the ground of about 13 feet 6 inches in one embodiment. An open top 36' is provided to allow up to approximately six to nine crushed vehicles to be loaded from overhead and adjacent the fixed sidewall 30, when the vehicles have adequately flattened profiles for stacking generally horizontal on the platform 16. The height of the fixed sidewall 30 is manufactured to be adequate to retain the flattened profiles of each upper-most stacked vehicle approximately proximal of, or lower than, the open top 36' and the height of the lengthwise upper frame 32 of the fixed sidewall 30. The platform 16 further includes a fixed front end wall portion 22 and a fixed rear end wall portion 24 aligned generally parallel with each other and spaced apart a sufficient length to accommodate therebetween a plurality of crushed vehicles having an end-to-end length of about forty feet to about forty-one feet. The front and rear end wall portions 22, 24 are joined to the platform 16 to form respectively, a front lower junction 22' and a rear lower junction 24' at respective corners of a lower frame 32' of the fixed sidewall 30. The upper edge of the mid-portion of each front and rear end wall portion 22, 24 is angled downwards toward the platform second side 16", thereby providing a lower height threshold for lifting crushed vehicles over either front or rear end wall portion 22, 24 when loading crushed vehicles across the platform second side 16" by a forklift 90 (see FIG. 2) or other lifting and loading device. The fixed sidewall 30 and fixed end wall portions 22, 24 can be manufactured with steel or aluminum to provide rigid containment walls for a plurality of crushed vehicles stacked on the platform 16.

A second sidewall 34 is positioned to extend vertically along the length of the platform second side 16". The second sidewall 34 is mounted for clamshell movement to a closed position 40' in which a base edge 38 is disposed adjacent the platform second side 16", thereby positioning the second sidewall 34 substantially parallel with the fixed sidewall 30 (see FIG. 3A). The second sidewall 34 is pivotably disposed to an open, raised position 40 above the platform 16 (see FIGS. 2, 3B and 6), by at least one hydraulic mechanism 50 powered by a hydraulic power system and motor 60 controlled by an operator when the semi-trailer 10 is stationary. The second sidewall 34 includes an upper frame 36 extended between an upper corner of an upper front support segment 42 and an upper corner of an upper rear support segment 44. When in the closed position 40', the upper front support member 42 has a pivot connector end 42' extended above the front end wall 22, and the upper rear support segment 44 has a pivot connector end 44' extended above the rear end wall. Both connector ends 42', 44' are configured to extend laterally about eight feet to traverse the platform width and to connect pivotably at respective front and rear pivot junctions 26', 28' proximal of the upper front and rear corners of the fixed sidewall 30. The second sidewall 34 and upper front and rear segments 42, 44 can be manufactured with steel or aluminum.

The upper frame 32 of the fixed sidewall 30 and the upper frame 36 of the second sidewall 34 provide a boundary for an open top 36' allowing top loading access to a significant interior volume of contained space. The contained space provided by the semi-trailer 10 is bounded by the length of the fixed sidewall 30, the front end wall 22 having the upper front support segment 42 aligned thereon, the rear end wall 24 having the upper rear support segment 44 aligned thereon, and the second sidewall 34 when disposed in the closed position 40'. The interior volume provided by the trailer 10 with the second sidewall 34 closed is in a range of between about 2,798 cubic feet to about 3,250 cubic feet, depending on a height of the walls surrounding the platform 16 extended between the fixed sidewall 30 and the second sidewall 34. A preferred configuration of the walls when fixed in generally vertical orientation and enclosing the platform 16 includes a height extending above the platform 16 of about 8 feet 6 inches high for the fixed sidewall 30 and second sidewall 34 in the closed position 40', with inside widths of about 8 feet wide for the front and rear end walls 22, 24, and an inside length of about 41 feet 6 inches between the front and rear end walls 22, 24.

Figure 4:
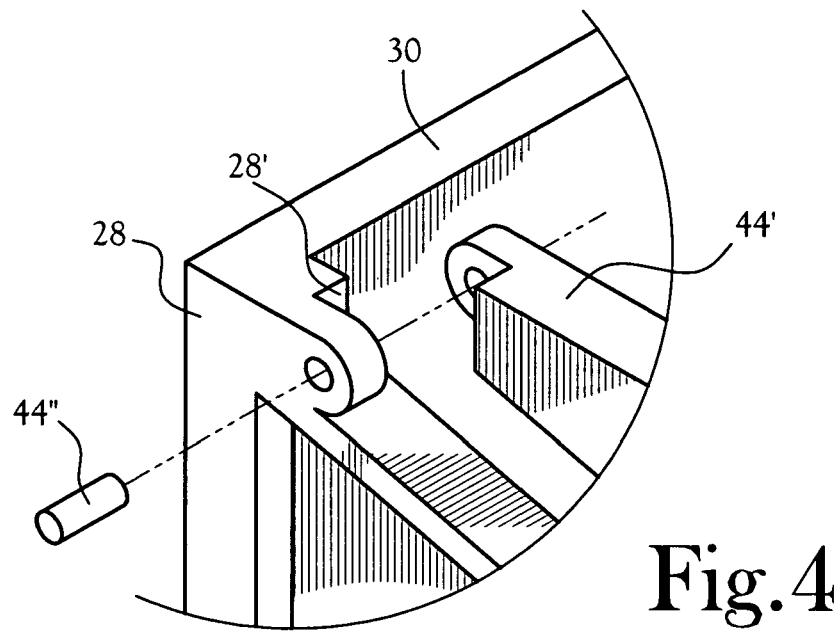
FIG. 4 is an exploded view of an upper corner pivot connection for an upper rear support segment extended from the movable second sidewall.

The front pivot connector end 42' of upper front support segment 42 is pivotably mounted by connection with at least one connector pin 42" to an offset pivot junction 26' proximal of the upper front corner 26 of the front end wall 22 in the same manner as illustrated in FIG. 4. The rear pivot connector end 44' of upper rear support segment 44 is pivotably mounted by connection with at least one connector pin 44" to an offset pivot junction 28' proximal of the upper rear corner 28 of the rear end wall 24 (see FIGS. 1 and 4). With the second sidewall 34 in the closed position 40', the upper front support segment 42, front end wall 22, upper rear support segment 44 and rear end wall 24 are extended a sufficient height above the platform 16 to provide for enclosure of a plurality of stacked crushed vehicles 80, 80', 80", 80'" up to a height of about eight feet and six inches above the platform 16. When pivoted in a clamshell movement to the raised position 40, the elevated second sidewall 34 provides an unobstructed length of the second side 16" to allow rapid loading and stacking, and rapid unloading of crushed vehicles and other recyclable materials on or off platform 12.

Figure 3B:
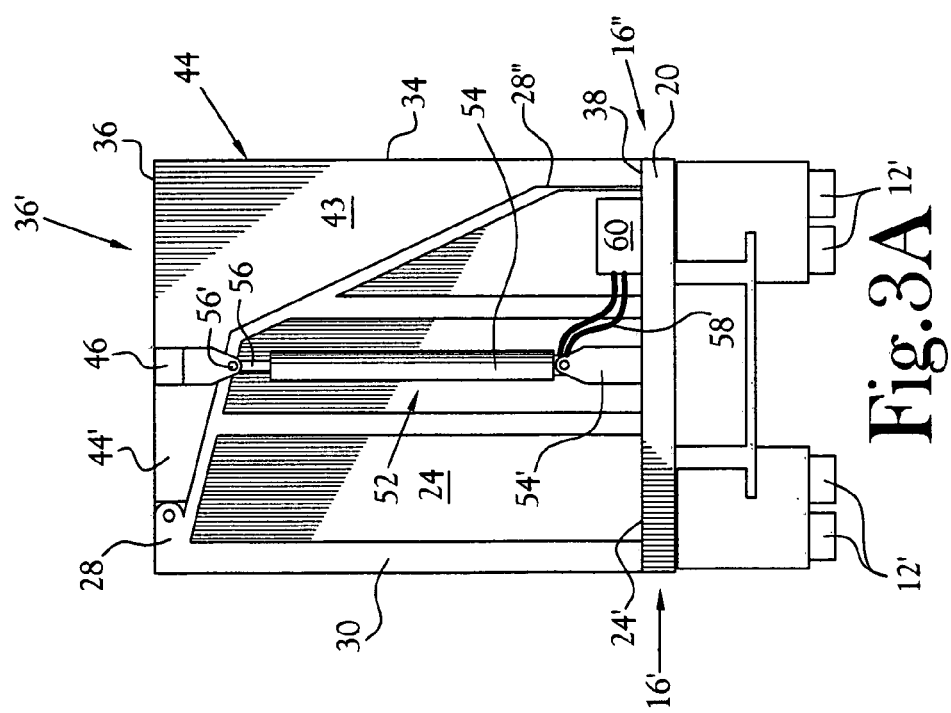
FIG. 3B is a rear view of FIG. 3A, illustrating the raised position of the movable second sidewall for loading and unloading of the semi-trailer.

The upper front support segment 42 and upper rear support segment 44 are shaped to have a substantially triangular width when viewed in cross-section from the rear or front ends of the semi-trailer 10. Each upper support segment 42, 44 is generally rigid and includes a front and rear reinforced central gusset member 43 having respective lower edges which contact against an upper edge of respective front end wall 22 and rear end wall 24 when the second sidewall 34 is positioned in the closed position 40'. An upper corner of the front support segment 42, specifically the front pivot connector end 42', is pivotably attached proximal of the front upper corner 26 of the fixed sidewall 30 and the front end wall 22. The front upper corner 26 is disposed at a height of between about eight feet to about eight feet and six inches above the platform 16. The rear upper corner 28 is disposed at a height of between about eight feet to about eight feet and six inches above the platform 16, and includes rear pivot connector 44' as illustrated in FIGS. 3A and 3B. The second and lesser height of a second front end wall corner 26" and a second rear end wall corner 28" is between about a third or a half of the first height, providing end wall heights of between about four feet to about six feet above the platform 16. The lesser height of the end wall corners 26", 28" provide a lower threshold for lifting crushed vehicles over either front or rear end wall proximal of the platform second side 16" (see FIG. 2).

A hydraulic mechanism 50 is provided for movement and positioning the second sidewall 34 between closed 40' and open 40 positions. A preferred embodiment includes a pair of hydraulic members positioned exterior of each front end wall 22 and rear end wall 24. At least one rear hydraulic cylinder system 52 includes a cylinder body 54 having a piston arm 56 extendable therefrom, and includes a cylinder base 54' pivotably mounted on the exterior surface of the rear end wall 24 at about a mid-portion of the base width of the rear end 20 of the platform 16 (see FIGS. 3A and 3B). The rear hydraulic cylinder system 52 includes a piston arm 56 extended to a distal end 56' that is pivotably connected utilizing a pin 56" to a rear mid-wall connection 46 (see FIG. 5), and fixed to an upper mid-portion of rear support segment 44 (see FIGS. 1, 3A and 3B). A second rear cylinder and piston can be utilized (not shown) proximal of the first rear hydraulic cylinder 54 and piston arm 56 for synchronous movement to a stationary raised position 40 for the upper rear support segment 44, the upper frame 36 and upper front support segment 42 of the second sidewall 34.

Figure 5:
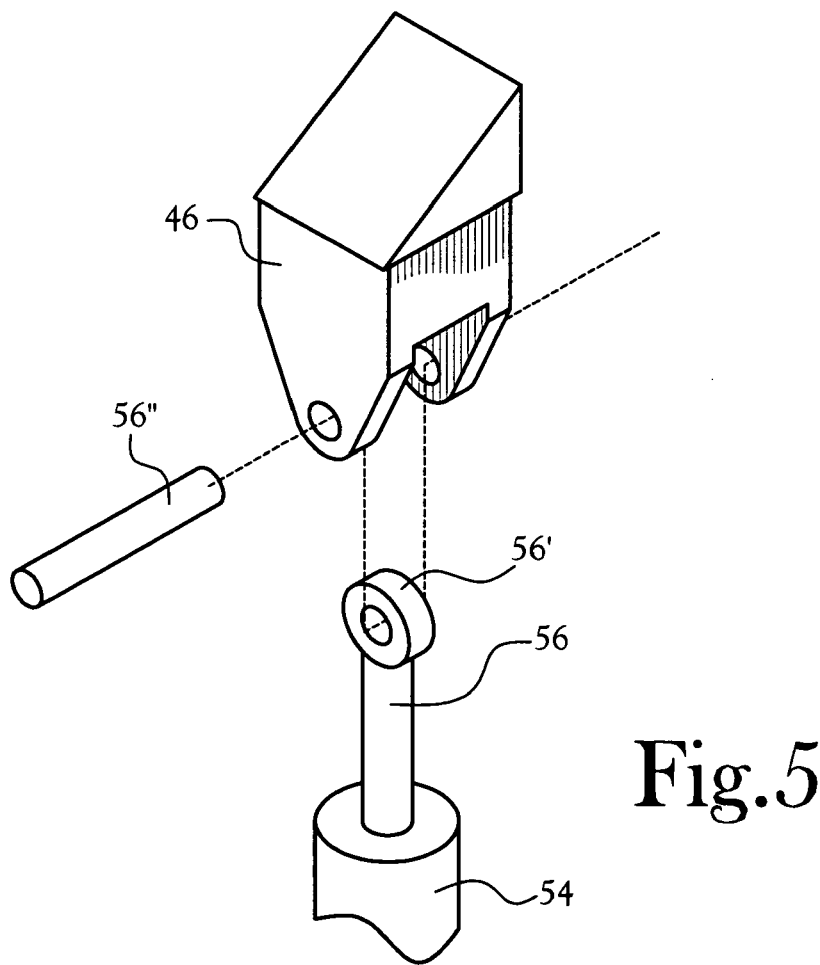
FIG. 5 is an exploded view of a mid-portion connection joint for a hydraulicly actuated piston utilized in lifting the movable second sidewall.

For a preferred embodiment of the hydraulic mechanism 50, at least one front hydraulic cylinder system 62 (see FIG. 6) is included having a cylinder body 64 from which a piston arm 66 is extendable, and having a cylinder base 64' that is pivotably mounted on the exterior surface at about a mid-portion of the base width of the front end wall 22 in a configuration similar to that illustrated in FIGS. 3A, 3B and 5). The front hydraulic cylinder system 62 includes a piston arm 66 extended to a distal end 66' that is pivotably connected to a front mid-wall connection 48 fixed to an upper mid-portion of front upper support segment 42. A second front cylinder and piston can be utilized (not shown) proximal of the first front hydraulic cylinder 64 and piston arm 66 for synchronous movement to the raised position 40 of the front upper support segment 42 of a heavily weighted upper frame 36 and second side wall 34. The rear and front hydraulic cylinder systems 52, 62 are supplied with hydraulic power by pressurized hydraulic fluid transmitted by a plurality of hydraulic hoses 58, 68 in fluid connection with a hydraulic power system and motor 60 of approximately six horsepower positioned on the platform rear end 20. An auxiliary hydraulic power motor 60' can be positioned on the platform front end wall 22 (see FIG. 6). The plurality of hydraulic hoses 58, 68 are detachably connectable to additional hydraulic hoses (not shown) and/or to a hydraulic power system typically powered by the engine of a tractor-truck vehicle having an adequate size to tow the semi-trailer 10 over public roads.

A hydraulic power and motor control mechanism of conventional design (not shown) such as hand-operated lever controls are provided to allow an operator to control the hydraulic pressure supplied to respective rear and front hydraulic cylinders 54, 64 thereby controlling the synchronous raising of the second sidewall 34 from the closed position 40' to the open position 40 above the platform 16 when the semi-trailer 10 is parked in a stationary position. A lock-out mechanism is provided as part of the hydraulic power and motor control mechanism to negate the raising of the second sidewall 34 while the semi-trailer 10 is being moved, and to negate the lowering of the second sidewall 34 during loading and unloading of the platform 16. Upon elevation of the second sidewall 34 to the open position 40, a plurality of crushed vehicles 80, 80', 80", 80'" and/or other recyclable materials are readily loaded and stacked on the platform 16 by a forklift 90 (see FIG. 2), or rolled/slid onto the platform 16 from an adjacent loading ramp (not shown). When moved to the closed position 40', the second sidewall 34 contains the stacked crushed vehicles 80, 80', 80", 80'" and/or other recyclable materials for safe transport over public roads in compliance with U.S. Department of Transportation regulations.

Rapid loading and stacking of crushed vehicles onto the platform 16 is provided by a forklift 90 when the second sidewall 34 is elevated by the hydraulic mechanism 50 from the closed position 40' to the open position 40 above the platform 16. When a forklift 90 is not available for loading, a plurality of crushed vehicles and/or compacted recyclable materials are readily lowered by an overhead crane (not shown) through the open top 36' and into the contained space bounded by the fixed sidewall 30, the front end wall 22 having the upper front support segment 42 above, the closed second sidewall 34, and the rear end wall 24 having the upper rear support segment 44 above. An additional benefit of the semi-trailer 10 having the second sidewall 34 mounted for clamshell movement is the option of loading additional recyclable materials along with a plurality of crushed vehicles 80, 80', 80", 80'" from the platform second side 16" when the sidewall is raised 40. Alternatively, If the trailer 10 is not filled to its preferred twenty ton load capacity, the second sidewall 34 can be positioned in the closed position 40' and loading continued for any remaining unoccupied contained space by lowering from overhead a plurality of compacted or uncompacted recyclable materials through the open top 36'.

An additional embodiment for the second sidewall 34 and upper frame 36 includes a retractable canvas tarp or similar flexible synthetic cover that is extendable from an upper position above front support segment 42 to cover the length and width of the open top 36', to minimize loss of debris during transport of crushed vehicles and/or scrap materials from within the semi-trailer 10. Those skilled in the art will recognize that a semi-trailer 10 having one sidewall 34 mounted for clamshell movement can be utilized for transport of a plurality of salvageable materials and/or for transport of a plurality of large objects having recycle value and which require side-loading by a forklift 90 with the sidewall 34 in an elevated position 40. A unique feature of the semi-trailer 10 having one sidewall 34 mounted for clamshell movement includes the option of loading materials from an overhead position into the open top 36' when the sidewall 34 is in a closed position 40'. Also, no chains or straps are required to retain the materials in the semi-trailer 10. Rapid loading and unloading of materials is feasible whether the sidewall 34 is raised 40 or in the closed position 40', and no manipulation of chains or straps is required as is typical of prior transport trucks. One skilled in the art will recognize that either sidewall is mountable for clamshell movement above the platform 16. An additional embodiment includes a second side having a lower sidewall portion separate from an upwardly pivoting second sidewall. The second side lower sidewall can be hydraulicly pivotable along a base edge aligned with the platform second side 16", for movement of the lower sidewall to an inclined position (not shown) and forming a ramp extendable to a loading dock or the ground from the second side 16" to facilitate side access loading and unloading without departing from the spirit and scope of the present invention.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. A semi-trailer for contained transport of crushed vehicles, comprising:
    a platform supported by a wheeled undercarriage for transport on public roads, said platform having first and second sides from which substantially vertical walls are extended thereby bounding an open top of sufficient width and length to receive crushed vehicles therein;
    a first sidewall extended along said platform first side;
    front and rear end walls extended vertical from said platform, each end wall adjoins said first sidewall at respective front and rear corner junctions;
    a second sidewall pivotably disposed in a closed position adjacent said second side and opposed from said first sidewall, said second sidewall including front and rear upper support segments extended laterally from opposed upper corners of said second sidewall, said front and rear support segments having respective front and rear connecting ends aligned above and pivotably mounted to respective front and rear end walls proximal of said first sidewall; and
    a hydraulic cylinder pivotably connected to said platform and having a hydraulic piston slidably extended therefrom for pivotable connection to a mid-portion of one of said front and rear upper support segments, said piston is hydraulically extendable for clamshell movement of said front and rear support segments and said second sidewall to a raised position above said platform;
    whereby unobstructed side access to said platform for loading and unloading of vehicles is provided with said second sidewall in said raised position, and said second sidewall is pivotable to said closed position for contained transport of vehicles over public roads.

2. The semi-trailer of claim 1 wherein said second sidewall further including:
    an upper support frame extended lengthwise between an upper front corner and an upper rear corner of said second sidewall;
    a lower frame of sufficient vertical width to extend from said upper support frame to a base edge of sufficient horizontal length to sealingly engage against said platform second side when said second sidewall is in said closed position;
    said front upper support segment extended perpendicular from said upper front corner of said second sidewall for traversal of said platform above said front end wall;
    said rear upper support segment extended perpendicular from said upper rear corner of said second sidewall for traversal of said platform above said rear end wall; and
    said open top bounded by said front upper support segment, said upper support frame of said second sidewall, said rear upper support segment, and said first sidewall when said second sidewall is in said closed position;
    whereby said platform provides loading and unloading of crushed vehicles from overhead through said open top above said platform when said second sidewall is in said closed position.

3. The semi-trailer of claim 2 wherein said hydraulic cylinder and piston further includes:
    a front hydraulic cylinder having a front piston reciprocatingly extendable therefrom, said front hydraulic cylinder is pivotably connected to said platform exterior of a mid-portion of said front end wall, said front piston having a distal end extendable to connect to a mid-portion of said front upper support segment;
    a rear hydraulic cylinder having a rear piston reciprocatingly extendable therefrom, said rear hydraulic cylinder is pivotably connected to said platform exterior of a mid-portion of said rear end wall, said rear piston having a distal end extendable to connect to a mid-portion of said rear upper support segment;
    a hydraulic power system and motor disposed on said platform, said hydraulic power system having a plurality of hydraulic hoses detachably extended to respective front and rear hydraulic cylinders, said hydraulic power system and motor provides sufficient hydraulic pressure transmitted through said plurality of hydraulic hoses for synchronous hydraulic actuation and extension of respective front and rear pistons for synchronous movement of said front and rear upper support segments and said second sidewall; and
    a control mechanism in communication with said hydraulic power system and motor, said control mechanism is activated by an operator for controlled synchronous movement of said front and rear upper support segments and said second sidewall relative to said platform.

4. The semi-trailer of claim 3 wherein said second sidewall further including:
    said front upper support segment including a substantially triangular width in cross-section and having a reinforced central gusset member and a first lower support edge disposed in alignment above said front end wall when said second sidewall is moved to said closed position; and said rear upper support segment including a substantially triangular width in cross-section and having a reinforced central gusset member and a second lower support edge disposed in alignment above said rear end wall when said second sidewall is moved to said closed position.

5. The semi-trailer of claim 4 wherein said front and rear connecting ends of said second sidewall further include:

said front connecting end is releasably connected by at least one pivot pin to a front pivot junction on an upper portion of said front end wall proximal of said front corner junction with said first sidewall; and said rear connecting end is releasably connected by at least one pivot pin to a rear pivot junction on an upper portion of said rear end wall proximal of said rear corner junction with said first sidewall.

6. The semi-trailer of claim 5 wherein said platform supported by said wheeled undercarriage further including a front support retractably disposed under said platform front end wall, said front support is extendable to rest on a supporting surface for maintenance of said platform in a level configuration during loading and unloading, said front support is retractable under said platform front end wall during towed transport of said platform and wheeled undercarriage when coupled with a tractor-trailer vehicle for transport over public roads.

7. A semi-trailer for transport of salvageable materials, comprising:

a platform supported by a multi-wheeled undercarriage for transport on public roads, said platform having a fixed first sidewall extended vertically between along a first side of said platform, and front and rear end walls extending substantially perpendicular from respective front and rear corners of said first sidewall, said platform having an open top bounded by said sidewall and end walls, said open top having a sufficient width and length for positioning salvageable materials therein;

a second sidewall pivotably mounted to extend vertically above a second side of said platform, said second sidewall mounted for clamshell movement between a closed position substantially parallel with said fixed sidewall, to a raised position disposed above said platform, said second sidewall including:

front upper support segment aligned parallel above said front end wall when said second sidewall is in said closed position;

rear upper support segment aligned parallel above said rear end wall when said second sidewall is in said closed position; and said front and rear upper support segments extended the width of said platform to pivotably connected at respective front and rear upper corners to said fixed sidewall; and at least one hydraulic cylinder and piston member for movement of said second sidewall and front and rear upper support segments from said closed position to said raised position;

whereby said second sidewall in said raised position allows for unobstructed side assess to said platform for positioning of salvageable materials thereon, and said second sidewall in said closed position provides containment of the salvageable materials during towed transport over public roads.

8. The semi-trailer of claim 7 wherein said second sidewall including:

an upper support frame extended lengthwise between an upper front corner and an upper rear corner of said second sidewall when moved to said closed position adjacent said platform second side, said upper support frame supported for clamshell movement from said closed position adjacent said platform second side to said raised position above said platform;

a lower frame of sufficient width to extend from said upper support frame to a base edge of sufficient length to sealingly engage against said platform second side when said second sidewall is in said closed position;

said front upper support segment extended perpendicular from said upper front corner of said upper support frame for traversal of said platform above said front end wall, said front upper support segment extended to pivotably mount to said front corner junction of said fixed sidewall at an elevated height above said platform; and said rear upper support segment extended perpendicular from said upper rear corner of said upper support frame for traversal of said platform above said rear end wall, said rear upper support segment extended to pivotably mount to said rear corner junction of said fixed sidewall at an elevated height above said platform;

whereby said second sidewall composed of said upper support frame, said lower frame, said front upper support segment and said rear upper support segment is moved in reversible clamshell movement between said closed position and said raised position.

9. The semi-trailer of claim 8 wherein said at least one hydraulic cylinder including a first and second hydraulic cylinder positioned vertically and exterior of respective mid-portions of said front and rear end walls;

said first hydraulic cylinder having an hydraulic piston pivotably attached at a base end to said rear end wall proximal of said platform, said first hydraulic piston having a distal end from which a first piston arm is reciprocatingly extended, said first piston arm having an actuator end pivotably attached proximal of a rear mid-portion of said rear upper support segment;

said second hydraulic cylinder having an hydraulic piston pivotably attached at a base end to said front end wall proximal of said platform, said second hydraulic piston having a distal end from which a second piston arm is reciprocatingly extended, said second piston arm having an actuator end pivotably attached proximal of a front mid-portion of said front upper support segment; and a hydraulic system positioned exterior and adjacent said platform and including a hydraulic power generator and a plurality of hoses in fluid connection between said hydraulic power generator and respective first and second hydraulic cylinders;

whereby said hydraulic system being controllable by an operator for synchronized movement of said first and second piston arms for movement of said rear and front upper support segments and said second sidewall from said closed position to said raised position thereby providing unobstructed side access for positioning the crushed vehicles on said platform.

10. The semi-trailer of claim 9 wherein second sidewall further including:

said front upper support segment including a substantially triangular width in cross-section and having a reinforced central gusset member and a first lower support edge disposed in alignment above said front end wall when said second sidewall is moved to said closed position; and said rear upper support segment including a substantially triangular width in cross-section and having a reinforced central gusset member and a second lower support edge disposed in alignment above said rear end wall when said second sidewall is moved to said closed position.

11. The semi-trailer of claim 10 wherein said front and rear pivot connection ends of said second sidewall further includes:

said front pivot connection end is releasably connected by a pivot pin to said front corner junction of said front end wall and said fixed sidewall; and said rear pivot connection end is releasably connected by a pivot pin to said rear corner junction of said rear end wall and said fixed sidewall.

12. The semi-trailer of claim 11 wherein said platform supported by said multi-wheeled undercarriage further including a front support disposed under said platform front end wall, said front support is extendable to a supporting surface from maintenance of said platform in level configuration during loading and unloading, said front support is retractable during towed transport of said platform and multi-wheeled undercarriage when coupled to a tractor-trailer vehicle for transport on public roads.

13. A semi-trailer for contained transport of salvageable materials, comprising:

a platform supported by a multi-wheeled undercarriage for transport on public roads, said platform having an adequate width between first and second sides to receive a plurality of salvageable materials thereon, said platform including:

a fixed sidewall disposed to extend vertically along said platform first side;

front and rear end walls extended vertically from said platform and attached at respective front and rear corner junctions with said fixed sidewall;

a second sidewall having first and second support arms pivotably mounted proximally above respective front and rear walls for clamshell movement of said second sidewall between a closed position disposed in a substantially adjacent orientation along said platform second side, and a raised position disposed above said platform; and a hydraulic system for reciprocating clamshell movement of said second sidewall, said hydraulic system including a hydraulic cylinder connected exterior of one of said front and rear end walls and having a hydraulicly actuated piston extended from said hydraulic cylinder, said piston is extended to connect proximal of a mid-portion of either said first and second support arms of said second sidewall for reciprocating movement thereof;

whereby said platform is loaded and unloaded through said open top when said second sidewall is in said closed position, and said platform is loaded and unloaded by unimpeded side access along said second side of said platform when said second sidewall is in said raised position above said platform.

14. The semi-trailer of claim 13 wherein said second sidewall including:

an upper support frame extended lengthwise between an upper front corner and an upper rear corner of said second sidewall when moved to said closed position adjacent said platform second side, said upper support frame supported for clamshell movement from said closed position adjacent said platform second side to said raised position above said platform;

a lower frame of sufficient width to extend from said upper support frame to a base edge having sufficient length to sealingly engage against said platform second side when said second sidewall is in said closed position;

a front upper support segment extended perpendicular from said upper front corner of said upper support frame for traversal of said platform above said front end wall, said front upper support segment extended to pivotably mount to said front corner junction of said fixed sidewall at an elevated height above said platform; and a rear upper support segment extended perpendicular from said upper rear corner of said upper support frame for traversal of said platform above said rear end wall, said rear upper support segment extended to pivotably mount to said rear corner junction of said fixed sidewall at an elevated height above said platform;

whereby said second sidewall composed of said upper support frame, said lower frame, said front upper support segment and said rear upper support segment is moved in reciprocating clamshell movement between said closed position and said raised position.

15. The semi-trailer of claim 14 wherein said hydraulic system further including:

a first hydraulic cylinder having a base pivotably connected to an exterior portion of said front end wall and having a first hydraulicly activated piston extended to attach at a pivoting connection disposed on a mid-portion of said first support arm of said second sidewall;

a second hydraulic cylinder having a base pivotably connected to an exterior portion of said rear end wall and having a second hydraulicly actuated piston extended to attach at a pivoting connection disposed on a mid-portion of said second support arm of said second sidewall; and a hydraulic power generator and a plurality of a hydraulic hoses positioned in fluid connection between said hydraulic power generator and respective first and second hydraulic cylinders;

whereby said hydraulic power generator being controllable by an operator for synchronized movement of said first and second hydraulicly actuated pistons for movement of said upper front and rear support arms and said second sidewall from said closed position to said raised position thereby providing unobstructed second side access for loading and unloading salvageable materials on and off of said platform.

16. The semi-trailer of claim 15 wherein said second sidewall further including:

said front upper support segment including a substantially triangular width in cross-section and having a reinforced central gusset member and a first lower support edge disposed in alignment above said front end wall when said second sidewall is moved to said closed position;

said rear upper support segment including a substantially triangular width in cross-section and having a reinforced central gusset member and a second lower support edge disposed in alignment above said rear end wall when said second sidewall is moved to said closed position;

said front upper support segment having a front pivot connection end releasably connected by a pivot pin to said front corner junction of said fixed sidewall at said elevated height above said platform; and said rear upper support segment having a rear pivot connection end releasably connected by a pivot pin to said rear corner junction of said fixed sidewall at said elevated height above said platform.

17. The semi-trailer of claim 16 wherein said platform is supported by said multi-wheeled undercarriage including a front support disposed under said front end wall, said front support is extendable in length to contact a supporting surface for level orientation of said platform during loading and unloading, said front support is retractable during towed transport of said platform and wheeled undercarriage when coupled to a tractor-trailer vehicle for transport on public roads.

* * * * *